Patented June 16, 1931

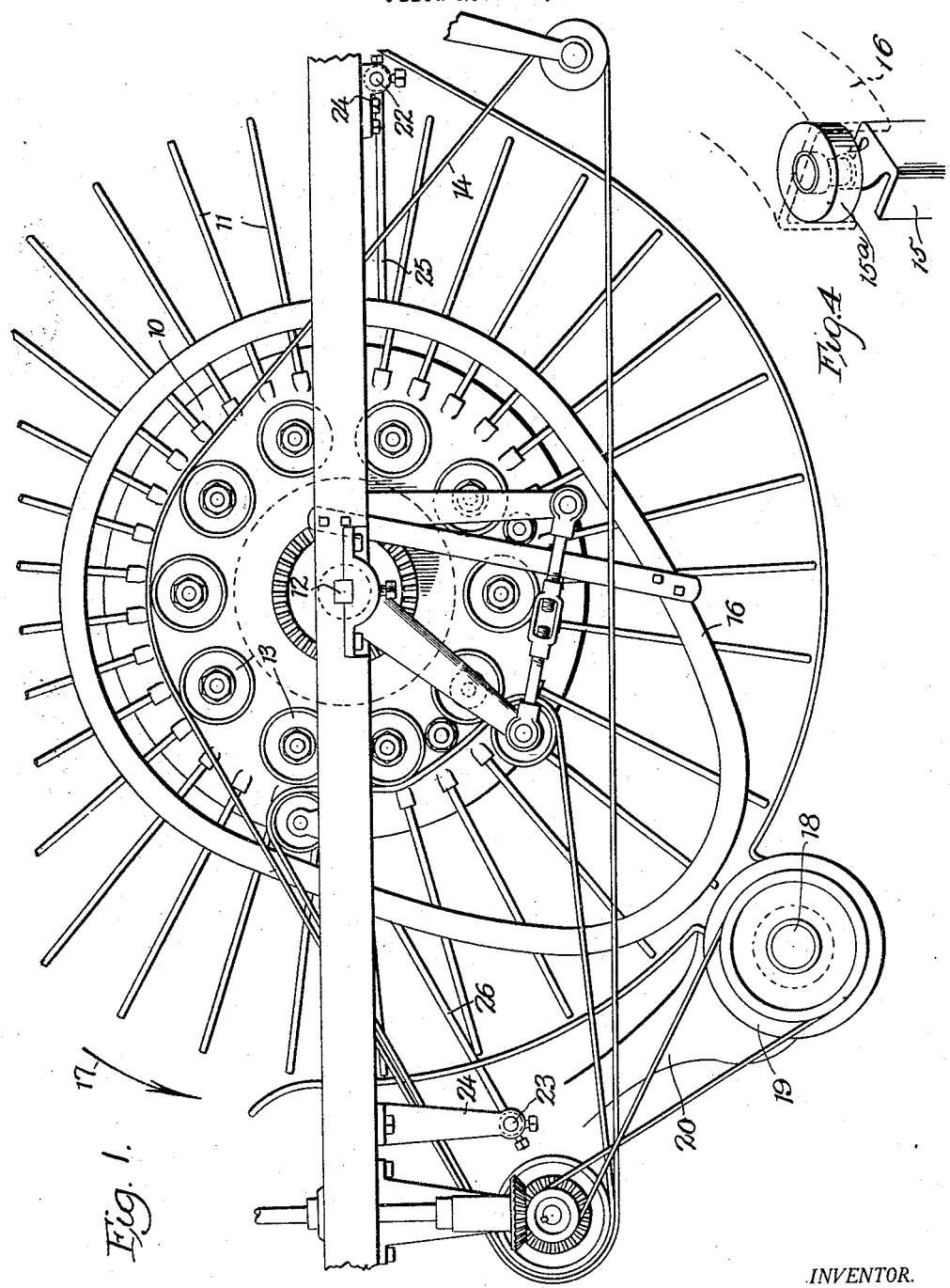

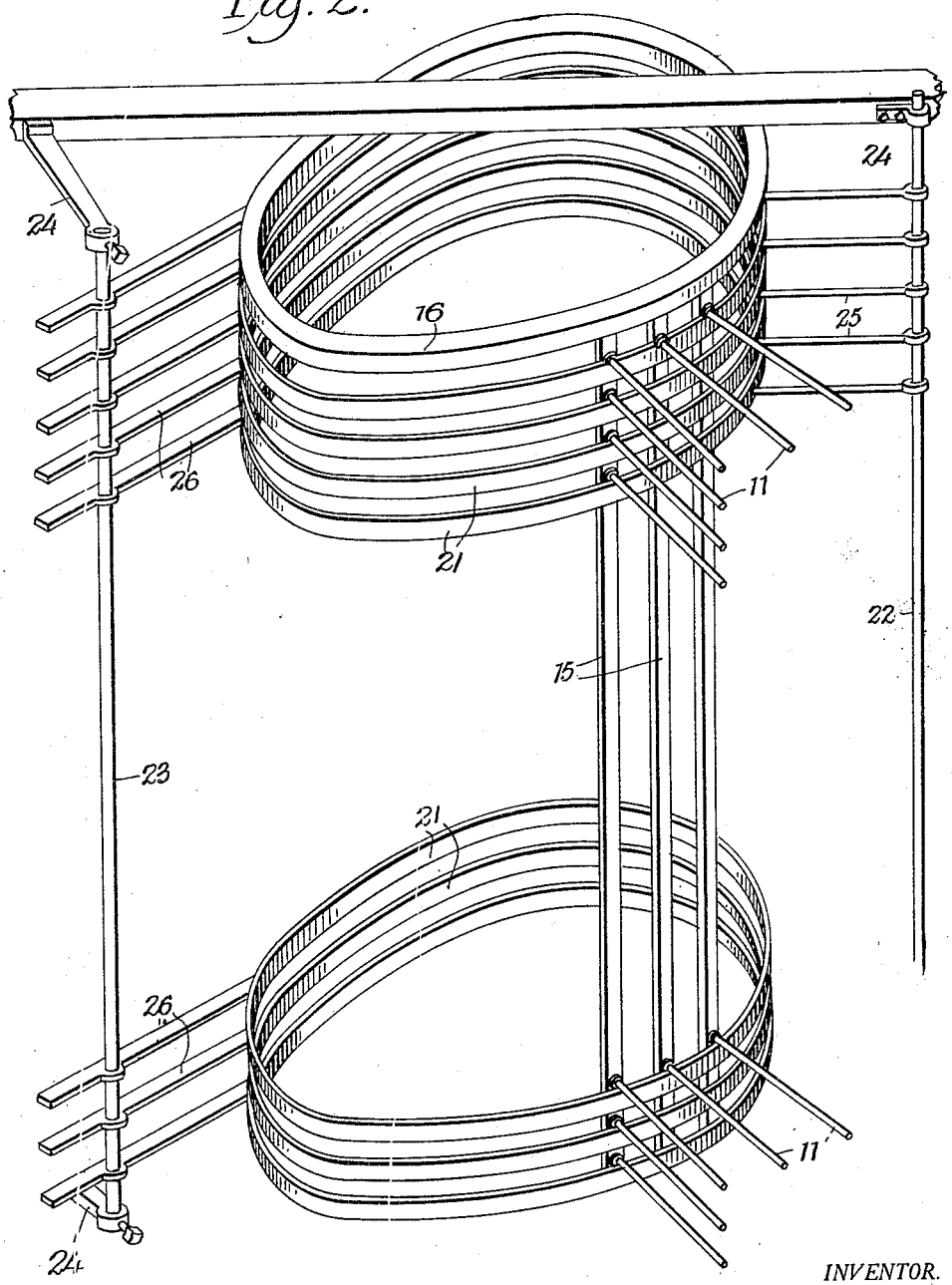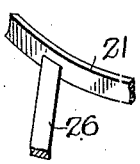

1,810,386

UNITED STATES PATENT OFFICE

HIRAM N. BERRY, OF GREENVILLE, MISSISSIPPI, ASSIGNOR, BY DIRECT AND MESNE ASSIGNMENTS, TO COTTON HARVESTER CORPORATION OF AMERICA, OF GREENVILLE, MISSISSIPPI, A CORPORATION OF DELAWARE

COTTON PICKER

Application filed November 28, 1927. Serial No. 236,229.

My present invention relates generally to cotton pickers of the rotary spindle type, and more particularly to a cotton picker of this type constructed along certain lines similar to that described and claimed in my Patent Number 1,742,493 which was granted January 7, 1930. In my patent just referred to I first proposed the use of means described and broadly claimed therein to prevent cotton from becoming packed on the spindles at the rear or inwardly beyond the stripper bars used to shift the cotton outwardly to the ends of the spindles where it may be readily removed by a doffing mechanism.

In the above patent I showed and described for the purpose stated a series of flexible bands or rings around the series of stripper bars, these bands being loosely held in place between the horizontal rows of spindles. Practise has demonstrated the efficiency of such an arrangement, the bands being formed of leather. Practise has also shown the necessity for some means of removing broken stalks and branches from between the spindles before the doffing mechanism is reached, and has demonstrated the efficiency for this purpose of a comb consisting of an upright having teeth extending between the horizontal rows of spindles at such an angle as to cause broken stalks and the like to slide on these teeth beyond the ends of the spindles.

In the interests of a combination of the above functions, I now propose bands or rings around the stripper bars which may be rigid and which are supported against movement by means extending into the spaces between the horizontal rows of spindles, certain of said supporting means being angled and serving the purpose of the comb teeth above set forth.

In the accompanying drawings, which illustrate my present invention, and form a part of this specification, Figure 1 is a partial top plan view of a cotton picker of the type to which my invention belongs, illustrating the practical application thereof.

Figure 2 is a skeleton perspective view showing certain parts directly affected by my present invention.

Figure 3 is a detail perspective view showing a portion of one of the protecting bands and an angled supporting member attached thereto.

Figure 4 is a detail perspective view showing one of the stripper bar rollers in one of the guide tracks.

Referring now to these figures, and particularly to Figure 1, I have shown at 10, one of the cylinders between which cotton is picked from the plant by means of rapidly rotating spindles 11, radiating therefrom. The cylinder 10, revolves upon its axis 12, and the spindles are rotated through connections including pulleys 13, above and around the cylinder, and a belt 14, with which the pulleys pass into and out of engagement during revolution of the cylinder 10, and at the inner side thereof.

The spindles 11, are arranged in vertical and horizontal rows and the spindles of each vertical row pass through the apertures of a stripper bar 15. Each bar 15, has at its ends suitable guide rollers $15^a$, (see Figure 4) engaging eccentric, grooved tracks 16, so positioned that the stripper bars are at their inner positions near the cylinder along the inner side of the latter, and in the revolution thereof in the direction of the arrow 17, the stripper bars as they are carried around the cylinder by the spindles are gradually shifted outwardly until they reach the out limits of their movement at the outer side of the cylinder opposite the doffing mechanism, all as shown in my Patent 1,742,493, before referred to.

The doffing mechanism includes a vertical, barbed roller doffing cotton from the ends of the spindles, and located adjacent to a suction mouth 19, from which the cotton is conveyed through a suction tube 20, the roller 18, being suitably driven.

To avoid danger of cotton gradually collecting and packing on the spindles inwardly or rearwardly of the stripper bars 15, by passage of small portions or wisps thereof around the sides of the stripper bars, a series of bands 21, are disposed around the series of bars and between the horizontal rows of spindles. Since these bands need not fit tightly and since the stripper bars have a definite plane of movement determined by the cam tracks 16, the protecting bands 21, may be rigid. Obviously they may be made of metal and must in such case be supported against circumferential movement. To do this and at the same time provide for combing foreign matter from the spindles, I provide near the front and rear portions of the cylinder uprights 22, and 23, connected to brackets 24. These uprights have arms 25, and 26, extending therefrom and inwardly toward the cylinder in the spaces between the horizontal rows of spindles, and while the angle of the front supporting arms 25, is unimportant, the angle of the rear arms 26, is quite important. From Figure 1, in particular it will be noted that as the cylinder revolves, any stalks or branches broken from plants at the cotton picking station will, before reaching the doffing roller 18, encounter the rear arms 26, and, since these arms are stationary, will be shifted outwardly beyond the ends of the spindles 10, and in this way discharged.

By virtue of my present invention, the protecting bands 21, may be formed of metal so as to last practically indefinitely, and the necessary supports made to serve a function for which it would otherwise be required that a comb be employed.

Having thus fully described my invention, what I claim and desire to secure by Letters Patent is,

1. In a cotton picker, a revolving cylinder, rotating spindles radiating from said cylinder, stripper bars, means to move said bars inwardly and outwardly on the spindles with respect to the cylinder, a series of protecting bands surrounding the stripper bars between the spindles, and supporting members extending from said bands to points beyond the ends of the spindles.

2. In a cotton picker, a revolving cylinder, rotating spindles radiating from said cylinder, stripper bars, means to move said bars inwardly and outwardly on the spindles with respect to the cylinder, a series of protecting bands surrounding the stripper bars between the spindles, and supporting members extending from said bands to points beyond the ends of the spindles, certain of said supporting members extending at an angle with respect to the cylinder between the spindles and acting as a comb to receive and discharge foreign matter from the spindles.

3. In a cotton picker, a revolving cylinder, rotating spindles radiating from said cylinder, stripper bars, means to move said bars inwardly and outwardly on the spindles with respect to the cylinder, a series of rigid protecting bands surrounding the series of stripper bars and conforming in shape to the plane of movement of said bars, and supports extending to said bands from points beyond the ends of the spindles.

4. In a cotton picker employing a series of radial rotating spindles arranged in horizontal rows, and revolving around a common axis, a series of stripper bars moving with said spindles, means to shift said bars during such movement inwardly and outwardly along the spindles, a series of protecting bands around the stripper bars between the horizontal rows of spindles, and supporting members at opposite sides of the series of spindles and attached to said bands between the horizontal rows of spindles, the said members at one side of the series of spindles being inclined with respect to the cylinder to act as combs for discharging foreign matter from the spindles.

5. In a cotton picker employing radial, rotating spindles arranged in horizontal rows and revolving around a common axis, a series of stripper bars, means to move said bars along the spindles during their revolution, a series of protecting bands surrounding the stripper bars between the rows of spindles, and means in connection with said bands for removing foreign matter from the spindles.

In testimony whereof I affix my signature.

HIRAM N. BERRY.